US012321897B2

United States Patent
Shrader

(10) Patent No.: US 12,321,897 B2
(45) Date of Patent: Jun. 3, 2025

(54) APPARATUS AND METHOD FOR GENERATING A SKILL PROFILE

(71) Applicant: DevReady Holdings, LLC, Englewood, CO (US)

(72) Inventor: Michael Shrader, Englewood, CO (US)

( * ) Notice: Subject to any disclaimer, the term of this patent is extended or adjusted under 35 U.S.C. 154(b) by 0 days.

(21) Appl. No.: 18/206,156

(22) Filed: Jun. 6, 2023

(65) Prior Publication Data

US 2024/0412168 A1   Dec. 12, 2024

(51) Int. Cl.
G06Q 10/105 (2023.01)
G06N 5/048 (2023.01)
G06Q 10/0639 (2023.01)

(52) U.S. Cl.
CPC .......... G06Q 10/105 (2013.01); G06N 5/048 (2013.01); G06Q 10/06398 (2013.01)

(58) Field of Classification Search
CPC . G06Q 10/105; G06Q 10/06398; G06N 5/048
USPC ...................................................... 705/7.42
See application file for complete search history.

(56) References Cited

U.S. PATENT DOCUMENTS

| 10,832,219 | B2 | 11/2020 | Jersin | |
| 2009/0089751 | A1* | 4/2009 | Raikes | G06F 9/453 717/120 |
| 2021/0374649 | A1* | 12/2021 | Haldar | G06Q 10/063112 |
| 2022/0092514 | A1 | 3/2022 | Guru | |
| 2022/0215317 | A1 | 7/2022 | Marty | |
| 2023/0252416 | A1* | 8/2023 | Stewart | G06Q 10/06311 705/321 |

FOREIGN PATENT DOCUMENTS

WO   2017/004451 A1   1/2017

OTHER PUBLICATIONS

Performance Analysis of Machine Learning—Semantic Relational Approach based Job Recommendation System Denis R et al. May 2, 2023 (Year: 2023).*

* cited by examiner

Primary Examiner — Po Han Lee
(74) Attorney, Agent, or Firm — Caldwell Intellectual Property Law

(57) ABSTRACT

An apparatus and method for generating a skill profile, the apparatus including at least a processor and a memory communicatively connected to the processor, the memory containing instructions configuring the processor to receive user data including a plurality of skillsets, receive reception feedback, retrieve network data utilizing a web crawler, generate a plurality of skillset summaries as a function of the user data and reception feedback, generate a skill summary bank including the plurality of skillset summaries, generate a performance score for each skillset summary in the skill summary bank, rank the plurality of skillsets summaries based on the performance score and network data, and generate a skill profile based on the ranked plurality of skillset summaries.

20 Claims, 9 Drawing Sheets

APPARATUS AND METHOD FOR GENERATING A SKILL PROFILE

FIELD OF THE INVENTION

The present invention generally relates to the field of profile generation. In particular, the present invention is directed to an apparatus and method for generating a skill profile.

BACKGROUND

Current methods for classifying data to highlight skills of a user are insufficient. There is a need for optimization of classification of a user's skills in light of third reception feedback and network data.

SUMMARY OF THE DISCLOSURE

In an aspect, an apparatus for generating a skill profile, the apparatus including at least a processor and a memory communicatively connected to the processor, the memory containing instructions configuring the processor to receive user data including a plurality of skillsets, receive reception feedback, retrieve network data utilizing a web crawler, generate a plurality of skillset summaries as a function of the user data and reception feedback, generate a skill summary bank including the plurality of skillset summaries, generate a performance score for each skillset summary in the skill summary bank, rank the plurality of skillsets summaries based on the performance score and network data, and generate a skill profile based on the ranked plurality of skillset summaries.

In another aspect, a method for generating a skill profile, the method including using a computing device to receive user data including a plurality of skillsets, receive reception feedback, retrieve network data utilizing a web crawler, generate a plurality of skillset summaries as a function of the user data and reception feedback, generate a skill summary bank including the plurality of skillset summaries, generate a performance score for each skillset summary in the skill summary bank, rank the plurality of skillsets summaries based on the performance score and network data, and generate a skill profile based on the ranked plurality of skillset summaries.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for generating a skill profile. In an embodiment, a skill profile may be a resume.

Aspects of the present disclosure can be used to generate skillsets of a user, classify reviews, ratings, and feedback from customers to a user, and rank the skillsets of a user based on marketability to optimize the formatting of the skill profile. Aspects of the present disclosure can also be used to share a user's skill profile with a plurality of third parties.

Exemplary embodiments illustrating aspects of the present disclosure are described below in the context of several specific examples.

Figure 1:
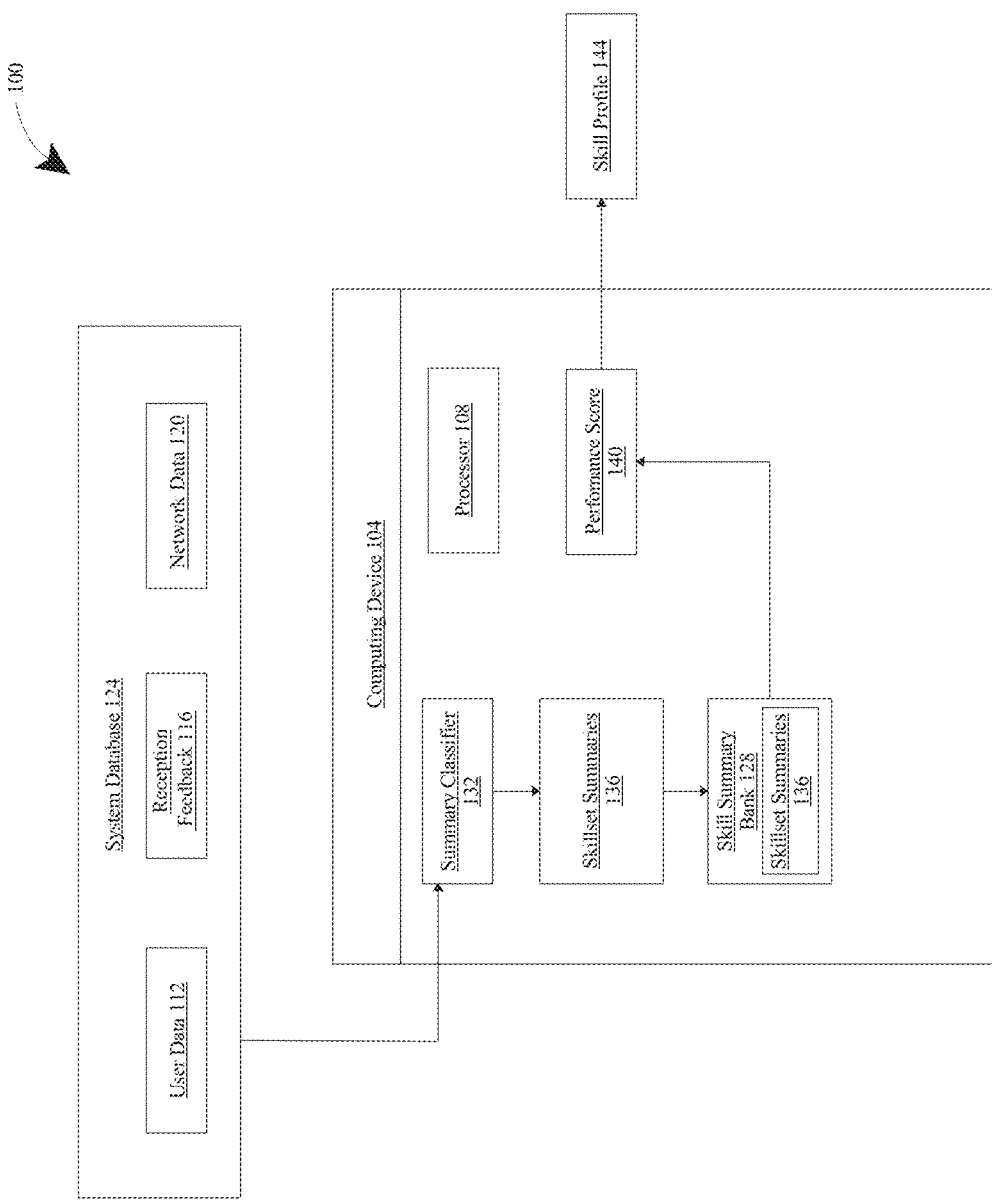
FIG. 1 is a diagram illustrating an apparatus for generating a skill profile.

Referring now to FIG. 1, an exemplary embodiment of apparatus 100 for generating a skill profile is illustrated. Apparatus 100 includes a computing device 104 containing at least a processor 108 and a memory communicatively connected to the processor, the memory containing instructions configuring the at least processor 108 to conduct actions as disclosed throughout this application. Processor 108 may include, without limitation, any processor described in this disclosure. Processor may be included in a computing device. Computing device 104 may include any computing device as described in this disclosure, including without limitation a microcontroller, microprocessor, digital signal processor (DSP) and/or system on a chip (SoC) as described in this disclosure. Computing device 104 may include, be included in, and/or communicate with a mobile device such as a mobile telephone or smartphone. Computing device 104 may include a single computing device operating independently, or may include two or more computing device operating in concert, in parallel, sequentially or the like; two or more computing devices may be included together in a single computing device or in two or more computing devices. Computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device 104 may include but is not limited to, for example, a computing device or cluster of computing devices in a first location and a second computing device or cluster of computing devices in a second location. Computing device 104 may include one or more computing devices dedicated to data storage, security, distribution of traffic for load balancing, and the like. Computing device 104 may distribute one or more computing tasks as described below across a plurality of computing devices of computing device, which may operate in parallel, in series, redundantly, or in any other manner used for distribution of tasks or memory between computing devices. Computing device 104 may be implemented, as a non-limiting example, using a "shared nothing" architecture.

With continued reference to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, computing device 104 is configured to receive user data 112. "User data," as used herein, is information describing a user. A description of a user may include physical, personal, subjective, or objective information. A user may include a worker, employee, or a person seeking employment. Data, as described throughout this disclosure, may be received through text, symbols, documents, photos, and the like. User data 112 may include information that may be used in user identification. "User identification," as used herein, is information related to the identity of a user. User identification may include a user's name, photo, license, and the like For example, user data 112 may include a user's name, photo, mailing address, office address, contact information, and the like. User data 112 may include one or more skillsets. A "skillset," as used herein, is information describing a user's talents, attributes, and qualifications in a relation to a subject. A subject may refer to a particular or generic job role, project, hobby, career, task, performance, and the like. For example, a skillset may identify the talents and skills of a freelance specialist, software engineer, pilot, and the like. In some embodiments, user data 112 may include an activity record. An "activity record," as used herein, is information related to a user's work experience. Work experience may include a description of careers, roles, projects, and performance associated with the user. Work experience may include the time spent in each role, reason for departure, tasks handled, responsibilities, and the like. User data 112 may include an education record. An "education record," as used herein, is information describing a user's education. The education record may include schools attended, degrees/certifications, language skills/proficiency, such as the number of languages known and the proficiency in each and the like. In some embodiments, computing device 104 may generate skillsets for a user based on the activity record, education record, and other forms of data as described further below.

Still referring to FIG. 1, in some embodiments, computing device 104 may be configured to receive reception feedback 116. "Reception feedback," as used herein, is information from a third party, describing a user. A third party may be a past or current customer of the user, a current or past employer of a user, a person or organization with authority to evaluate the user, such as a teacher or boss, and the like. A third party may include a professional organization, board, association, and other similar groupings. For example, a third party may be a disciplinary board for attorney. In another example, a third party may a be licensing board. Reception feedback 116 may include reviews, criticism, praise, and other comments about a user from a third party. For example, an evaluation of a user's proficiency in completing a job. In some embodiments, computing device 104 may be configured to receive and/or retrieve network data 120. "Network data," as used herein, is information regarding a practice area. A practice area may refer to a type of job, career, task, hobby, and the like. For example, network data 120 may be information describing to the social aspects of the medical field, such as pay, hiring practices, lay-offs, demands, and the like. Network data 120 may include skillsets commonly required, preferred, and/or discouraged for a plurality of jobs. Network data 120 may include education records commonly required, preferred, and/or discouraged for a plurality of jobs. Network data 120 may include activity records commonly required, preferred, and/or discouraged for a plurality of jobs.

Still referring to FIG. 1, user data 112, reception feedback 116, and network data 120 may be received from a graphical user interface by user input. A "graphical user interface," as used herein, is a graphical form of user interface that allows users to interact with electronic devices. In some embodiments, GUI may include icons, menus, other visual indicators, or representations (graphics), audio indicator such as primary notation, and display information and related user controls. In some embodiments, user data 112 may be received through a chatbot utilizing GUI as described further below.

Still referring to FIG. 1, user data 112, reception feedback 116, and network data 120 may be received from a system database 124 communicatively connected to computing device 104. As used in this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device 104. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure. A "system database," a used herein, is a data structure containing at least user data 112, reception feedback 116, and network data 120. System database 124 may include a user data table, reception feedback table, and a network data table, wherein a "table," is a categorization of data with a database. Databases, as described throughout this disclosure, may be implemented, without limitation, as a relational database, a key-value retrieval database such as a NOSQL database, or any other format or structure for use as a database that a person skilled in the art would recognize as suitable upon review of the entirety of this disclosure. Databases may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

Still referring to FIG. 1, each table of system database 124 may be populated by user input as described above and/or by a web crawler. "User input," as used herein, is the interaction between a user and a user interface. An interaction may include an upload of documents/files, text submission, and the like by a user. A "web crawler," as used herein, is a program that systematically browses the internet for the purpose of Web indexing. The web crawler may be seeded with platform URLs, wherein the crawler may then visit the next related URL, retrieve the content, index the content, and/or measures the relevance of the content to the topic of interest. In some embodiments, computing device 104 may generate a web crawler to scrape external user data 112, reception feedback 116, and network data 120 from a plurality of business, economic, review, and social media sites, blogs, or forums. The web crawler may be seeded and/or trained with a reputable website to begin the search. A web crawler may be generated by a computing device 104. In some embodiments, the web crawler may be trained with information received from a user through GUI. In some embodiments, the web crawler may be configured to generate a web query. A web query may include search criteria received from a user or third party. For example, a user may submit a plurality of websites for the web crawler to search for reception feedback 116 from and correlate to user data 112 and the like. Additionally, the web crawler function may be configured to search for and/or detect one or more data patterns. A "data pattern," as used in this disclosure is any repeating forms of information. A data pattern may include repeating reception feedback 116, network data 120, and the like. In some embodiments, the web crawler may be configured to determine the relevancy of a data pattern. Relevancy may be determined by a relevancy score. A relevancy score may be automatically generated by computing device 104, received from a machine learning model, and/or received from the user. In some embodiments, a relevancy score may include a range of numerical values that may correspond to a relevancy strength of data received from a web crawler function. As a non-limiting example, a web crawler function may search the Internet for external user data 112 related to an external user.

Still referring to FIG. 1, computing device 104 may receive user data 112 and/or reception feedback 116 using an application programming interface (API) query or integration. An "application programming interface," as used herein, is a way for two or more computer programs to communicate with each other. It is a type of software interface, offering a service to other pieces of software. An "API query," as used herein, is a request made by a client application to an API to retrieve or manipulate data. Types of API queries may include GET, POST, PUT, and DELETE requests, which may be used to retrieve, create, update, and delete data from an API, respectively. A "client application," as used herein, is a program that sends API queries to the API in order to retrieve, manipulate, or manage data. The client application may be or include the web crawler as described above, wherein the web crawler is seed with a URL and trained to perform one or more API queries. For example, a web crawler may be seeded with a user's LinkedIn page and perform an API query by requesting the experience information of a user's profile. In some embodiments, computing device 104 may be configured to retrieve user data 112 and/or reception feedback 116 by formulating an API query.

Still referring to FIG. 1, "API integration," as used herein, is the process of connecting different software systems or applications using APIs. API integration may allow different software components to communicate with each other, share data, and perform actions. API integration include integrating payment gateways, social media platforms, messaging services, or databases. It can also involve integrating internal software systems, such as CRM (Customer Relationship Management) systems, ERP (Enterprise Resource Planning) systems, or inventory management systems. API integration may include an authentication and security process. Authentication may refer to the process of verifying the identity of a user and/or client application that is attempting to access an API. This may include the user and/or client application sending a username and password or other authentication tokens to the API, which then verifies the credentials and grants access if they are valid. For example, a user may sign into LinkedIn with their user name and password, which when verified may grant access to the client application, such as the web crawler to retrieve data.

Still referring to FIG. 1, computing device 104 is configured to generate a skill summary bank 128 containing a plurality of skillsets summaries of a user based on the user data 112. A "skill summary bank," as used herein, is a data structure containing a plurality of skill set summaries. A "skillset summary," as used herein is overview information related to a user regarding a skillset. For example, a baker skillset may identify the talents user as to fulfill the professional role, the skillset summary 136 may include elements of reception feedback 116, education record and the like that is related to the skill. This may include customer reviews, culinary based education, and the like. Computing device 104 may generate a skillset and/or skillset summary 136 using a language processing model. A language processing module may include any hardware and/or software module. Language processing module may be configured to extract, from the one or more documents, one or more words. One or more words may include, without limitation, strings of one or more characters, including without limitation any sequence or sequences of letters, numbers, punctuation, diacritic marks, engineering symbols, geometric dimensioning and tolerancing (GD&T) symbols, chemical symbols and formulas, spaces, whitespace, and other symbols, including any symbols usable as textual data as described above. Textual data may be parsed into tokens, which may include a simple word (sequence of letters separated by whitespace) or more generally a sequence of characters as described previously. The term "token," as used herein, refers to any smaller, individual groupings of text from a larger source of text; tokens may be broken up by word, pair of words, sentence, or other delimitation. These tokens may in turn be parsed in various ways. Textual data may be parsed into words or sequences of words, which may be considered words as well. Textual data may be parsed into "n-grams", where all sequences of n consecutive characters are considered. Any or all possible sequences of tokens or words may be stored as "chains", for example for use as a Markov chain or Hidden Markov Model.

Still referring to FIG. 1, language processing module may operate to produce a language processing model. Language processing model may include a program automatically generated by computing device 104 and/or language processing module to produce associations between one or more words extracted from at least a document and detect associations, including without limitation mathematical associations, between such words. Associations between language elements, where language elements include for purposes herein extracted words, relationships of such categories to other such term may include, without limitation, mathematical associations, including without limitation statistical correlations between any language element and any other language element and/or language elements. Statistical correlations and/or mathematical associations may include probabilistic formulas or relationships indicating, for instance, a likelihood that a given extracted word indicates a given category of semantic meaning. As a further example, statistical correlations and/or mathematical associations may include probabilistic formulas or relationships indicating a positive and/or negative association between at least an extracted word and/or a given semantic meaning; positive or negative indication may include an indication that a given document is or is not indicating a category semantic meaning. Whether a phrase, sentence, word, or other textual element in a document or corpus of documents constitutes a positive or negative indicator may be determined, in an embodiment, by mathematical associations between detected words, comparisons to phrases and/or words indicating positive and/or negative indicators that are stored in memory at computing device 104, or the like.

Still referring to 1, language processing module and/or diagnostic engine may generate the language processing model by any suitable method, including without limitation a natural language processing classification algorithm; language processing model may include a natural language process classification model that enumerates and/or derives statistical relationships between input terms and output terms. Algorithm to generate language processing model may include a stochastic gradient descent algorithm, which may include a method that iteratively optimizes an objective function, such as an objective function representing a statistical estimation of relationships between terms, including relationships between input terms and output terms, in the form of a sum of relationships to be estimated. In an alternative or additional approach, sequential tokens may be modeled as chains, serving as the observations in a Hidden Markov Model (HMM). HMMs as used herein are statistical models with inference algorithms that that may be applied to the models. In such models, a hidden state to be estimated may include an association between an extracted words, phrases, and/or other semantic units. There may be a finite number of categories to which an extracted word may pertain; an HMM inference algorithm, such as the forward-backward algorithm or the Viterbi algorithm, may be used to estimate the most likely discrete state given a word or sequence of words. Language processing module may combine two or more approaches. For instance, and without limitation, machine-learning program may use a combination of Naive-Bayes (NB), Stochastic Gradient Descent (SGD), and parameter grid-searching classification techniques; the result may include a classification algorithm that returns ranked associations.

Continuing to refer to FIG. 1, generating language processing model may include generating a vector space, which may be a collection of vectors, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each vector in an n-dimensional vector space may be represented by an n-tuple of numerical values. Each unique extracted word and/or language element as described above may be represented by a vector of the vector space. In an embodiment, each unique extracted and/or other language element may be represented by a dimension of vector space; as a non-limiting example, each element of a vector may include a number representing an enumeration of co-occurrences of the word and/or language element represented by the vector with another word and/or language element. Vectors may be normalized, scaled according to relative frequencies of appearance and/or file sizes. In an embodiment associating language elements to one another as described above may include computing a degree of vector similarity between a vector representing each language element and a vector representing another language element; vector similarity may be measured according to any norm for proximity and/or similarity of two vectors, including without limitation cosine similarity, which measures the similarity of two vectors by evaluating the cosine of the angle between the vectors, which can be computed using a dot product of the two vectors divided by the lengths of the two vectors. Degree of similarity may include any other geometric measure of distance between vectors.

Still referring to FIG. 1, language processing module may use a corpus of documents to generate associations between language elements in a language processing module, and diagnostic engine may then use such associations to analyze words extracted from one or more documents and determine that the one or more documents indicate significance of a category. In an embodiment, language module and/or Computing device 104 may perform this analysis using a selected set of significant documents, such as documents identified by one or more experts as representing good information; experts may identify or enter such documents via graphical user interface, or may communicate identities of significant documents according to any other suitable method of electronic communication, or by providing such identity to other persons who may enter such identifications into Computing device 104. Documents may be entered into a computing device 104 by being uploaded by an expert or other persons using, without limitation, file transfer protocol (FTP) or other suitable methods for transmission and/or upload of documents; alternatively or additionally, where a document is identified by a citation, a uniform resource identifier (URI), uniform resource locator (URL) or other datum permitting unambiguous identification of the document, diagnostic engine may automatically obtain the document using such an identifier, for instance by submitting a request to a database or compendium of documents such as JSTOR as provided by Ithaka Harbors, Inc. of New York.

Still referring to FIG. 1, computing device 104 may generate a skillset and/or a skillset summary using optical character recognition. In some embodiments, optical character recognition or optical character reader (OCR) includes automatic conversion of images of written (e.g., typed, handwritten or printed text) into machine-encoded text. In some cases, recognition of at least a keyword from an image component may include one or more processes, including without limitation optical character recognition (OCR), optical word recognition, intelligent character recognition, intelligent word recognition, and the like. In some cases, OCR may recognize written text, one glyph or character at a time. In some cases, optical word recognition may recognize written text, one word at a time, for example, for languages that use a space as a word divider. In some cases, intelligent character recognition (ICR) may recognize written text one glyph or character at a time, for instance by employing machine learning processes. In some cases, intelligent word recognition (IWR) may recognize written text, one word at a time, for instance by employing machine learning processes.

Still referring to FIG. 1, in some cases OCR may be an "offline" process, which analyses a static document or image frame. In some cases, handwriting movement analysis can be used as input to handwriting recognition. For example, instead of merely using shapes of glyphs and words, this technique may capture motions, such as the order in which segments are drawn, the direction, and the pattern of putting the pen down and lifting it. This additional information can make handwriting recognition more accurate. In some cases, this technology may be referred to as "online" character recognition, dynamic character recognition, real-time character recognition, and intelligent character recognition.

Still referring to FIG. 1, in some cases, OCR processes may employ pre-processing of image component. Pre-processing process may include without limitation de-skew, de-speckle, binarization, line removal, layout analysis or "zoning," line and word detection, script recognition, character isolation or "segmentation," and normalization. In some cases, a de-skew process may include applying a transform (e.g., homography or affine transform) to image component to align text. In some cases, a de-speckle process may include removing positive and negative spots and/or smoothing edges. In some cases, a binarization process may include converting an image from color or greyscale to black-and-white (i.e., a binary image). Binarization may be performed as a simple way of separating text (or any other desired image component) from a background of image component. In some cases, binarization may be required for example if an employed OCR algorithm only works on binary images. In some cases. a line removal process may include removal of non-glyph or non-character imagery (e.g., boxes and lines). In some cases, a layout analysis or "zoning" process may identify columns, paragraphs, captions, and the like as distinct blocks. In some cases, a line and word detection process may establish a baseline for word and character shapes and separate words, if necessary. In some cases, a script recognition process may, for example in multilingual documents, identify script allowing an appropriate OCR algorithm to be selected. In some cases, a character isolation or "segmentation" process may separate signal characters, for example character-based OCR algorithms. In some cases, a normalization process may normalize aspect ratio and/or scale of image component.

Still referring to FIG. 1, in some embodiments an OCR process will include an OCR algorithm. Exemplary OCR algorithms include matrix matching process and/or feature extraction processes. Matrix matching may involve comparing an image to a stored glyph on a pixel-by-pixel basis. In some case, matrix matching may also be known as "pattern matching," "pattern recognition," and/or "image correlation." Matrix matching may rely on an input glyph being correctly isolated from the rest of the image component. Matrix matching may also rely on a stored glyph being in a similar font and at a same scale as input glyph. Matrix matching may work best with typewritten text.

Still referring to FIG. 1, in some embodiments, an OCR process may include a feature extraction process. In some cases, feature extraction may decompose a glyph into features. Exemplary non-limiting features may include corners, edges, lines, closed loops, line direction, line intersections, and the like. In some cases, feature extraction may reduce dimensionality of representation and may make the recognition process computationally more efficient. In some cases, extracted feature can be compared with an abstract vector-like representation of a character, which might reduce to one or more glyph prototypes. General techniques of feature detection in computer vision are applicable to this type of OCR. In some embodiments, machine-learning process like nearest neighbor classifiers (e.g., k-nearest neighbors algorithm) can be used to compare image features with stored glyph features and choose a nearest match. OCR may employ any machine-learning process described in this disclosure. Exemplary non-limiting OCR software includes Cuneiform and Tesseract. Cuneiform is a multi-language, open-source optical character recognition system originally developed by Cognitive Technologies of Moscow, Russia. Tesseract is free OCR software originally developed by Hewlett-Packard of Palo Alto, California, United States.

Still referring to FIG. 1, in some cases, OCR may employ a two-pass approach to character recognition. Second pass may include adaptive recognition and use letter shapes recognized with high confidence on a first pass to recognize better remaining letters on the second pass. In some cases, two-pass approach may be advantageous for unusual fonts or low-quality image components where visual verbal content may be distorted. Another exemplary OCR software tool include OCRopus. OCRopus development is led by German Research Centre for Artificial Intelligence in Kaiserslautern, Germany. In some cases, OCR software may employ neural networks as described in this disclosure.

Still referring to FIG. 1, in some cases, OCR may include post-processing. For example, OCR accuracy can be increased, in some cases, if output is constrained by a lexicon. A lexicon may include a list or set of words that are allowed to occur in a document. In some cases, a lexicon may include, for instance, all the words in the English language, or a more technical lexicon for a specific field. In some cases, an output stream may be a plain text stream or file of characters. In some cases, an OCR process may preserve an original layout of visual verbal content. In some cases, near-neighbor analysis can make use of co-occurrence frequencies to correct errors, by noting that certain words are often seen together. For example, "Washington, D.C." is generally far more common in English than "Washington DOC." In some cases, an OCR process may make us of a priori knowledge of grammar for a language being recognized. For example, grammar rules may be used to help determine if a word is likely to be a verb or a noun. Distance conceptualization may be employed for recognition and classification. For example, a Levenshtein distance algorithm may be used in OCR post-processing to further optimize results.

Still referring to FIG. 1, the language processing model and the OCR process may be used by computing device 104 to process and analyze reception feedback 116, user data 112, and network data 120, run chatbots, and classify/extract text. For example, a natural language processing (NPL) model may aid the classification of reception feedback 116 to positive or negative feedback, wherein the language model may be trained to associate words such as "great," "quick," "friendly," to positive feedback and the like. OCR may be used in tandem with a NPL model to extract information describing or related to a skillset from a plurality of unstructured text sources. For example, user data 112, and reception feedback 116 may be received as plurality of documents such as cover letters, essays, licenses, invoices, and the like, wherein OCR technology may be used and extract terms and phrases such as "account," "12 years experience," "proficient in Microsoft word," "great communication skills," and the like. Classification of data to positive or negative categories may be used in calculating scores, such as a performance score 140 as described further below.

Still referring to FIG. 1, computing device 104 may generate one or more skillset summaries 136 using a summary classifier 132. A "classifier," as used in this disclosure is a machine-learning model, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Summary classifier 132 may be configured to receive user data 112, reception feedback 116, and/or outputs of the NPL or OCR reader as inputs and output a plurality of skillset summaries 136. Summary classifier 132 may be trained with a summary training dataset containing data correlating reception feedback 116 and/or user data 112, such as user identification, to a plurality of skillset summaries 136. Summary training dataset may be retrieved from a database. Correlations may incorporate the output the language processing module and optical character recognition reader as described above. Computing device 104 and/or another device may generate summary classifier 132, and any other classifier as described throughout this disclosure, using a classification algorithm, defined as a processes whereby a computing device 104 derives a classifier from training data. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. The plurality of skillset summaries 136 may be stored in the memory of computing device 124 for further processing.

Still referring to FIG. 1, computing device 104 is configured to generate skill summary bank 128 as a function of the skillset summaries 136. Skill summary bank 128 may contain a plurality of skillset summaries 136 matched to a user. Computing device may be configured to compile the plurality of skillset summaries outputted by summary classifier 132 into summary bank 128. A compilation may refer to a processor of computing device 104 executing instructions in a program to manipulate data sorted in computing device 104 memory. Computing device may compile a plurality of skillset summaries belonging to a user Still referring to FIG. 1, computing device 104 may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A)P(A)\div P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device 104 may then calculate a likelihood table by calculating probabilities of different data entries and classification labels. Computing device 104 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 1, computing device 104 may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm: $l=\sqrt{\Sigma_{i=0}^{n} a_i^2}$, where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

Still referring to FIG. 1, in some embodiments, computing device 104 may be configured to verify user data 112, reception feedback 116, and the like. Verification may refer to determining the accuracy of information. Verifying data received by computing device 104 may include language vetting. "Language vetting," as used herein, is the process of evaluating the language proficiency of individuals who are applying for a job or seeking admission to a program or institution. Language vetting may include computing device 104 generating, conducting, and/or transmitting written/oral assessments or interviews for a user to complete using a chatbot as described further below. As used in the current disclosure, a "chatbot" is a computer program designed to simulate conversation with users. Assessments and interviews may include tests constructed to test a user's speaking, writing, and comprehension skills, such as an English language proficiency test. In some embodiments, verifying data may include computing device 104 generating, conducting, and/or transmitting a skills test for a user to complete through a chatbot or user interface as described above. A "skills test," is an assessment tool that is used to evaluate a person's proficiency in a specific skill or set of skills. For example, a skills test for a programming job may involve writing code to solve a specific problem, while a skills test for a customer service job may involve role-playing scenarios with customers. Computing device 104 may receive questions, assessments, and the like to use in language vetting or skills test from a vetting database. A "vetting database," as used herein, is a data structure containing information to be used in assessment of a user. In some embodiments, computing device 104 may generate language vetting tests and skills tests for a user to completed using a classifier. For example, a questionnaire classifier may be configured to receive user data 112, skillsets, skillset summaries 136, and/or skillset summary 136 bank as inputs and output skills test containing questions matching a user's experience. Questionnaire classifier training data may correlate elements of user data to elements of a language vetting test and/or skills test.

Still referring to FIG. 1, computing device may use a codebot to analyze a user's skills test for verification and/or efficiency purposes. For example, a skills test may require a user to write a line of code or aspects of a program using a coding language such as JAVASCRIPT, Python, MATLAB, C #, an object orientated programming language, markup language, or the like. A "codebot," as used herein, is tool for evaluating code. A codebot may include a machine-learning process, wherein the codebot is trained with snippets of code and coding language and configured to verify the efficiency and/or accuracy of a code. A codebot may perform static analysis on source code, which may involve analyzing code without executing it. This may help identify potential bugs, syntax errors, and other issues in the code. Static analysis may also be used to enforce coding standards and best practices. As a non-limiting example, in the case where the skills test involves JAVASCRIPT code, codebot may check whether each line of code ends with a ";" and flag instances where it does not. A codebot can also run automated tests on code to check for issues such as unit test failures, integration issues, or performance problems. As a non-limiting example, codebot may input one or more test inputs into the skills test response and receive one or more outputs; these outputs may be compared to test outputs that represent expected outputs for successful completion of the skills test. This may help ensure that the code is functioning correctly and efficiently. For example, the codebot may identify a clock cycle of a code or program received from the user in the skills test. A clock cycle may be used by the codebot to determine how fast an instruction can be executed by a computer processor for efficiency purposes. The number of errors or the length and number clock cycles in a user's code related skills test may be used to determine if a user accurately and/or sufficiently possess the skills disclosed in user data 112.

Still referring to FIG. 1, computing device 104 is configured to generate a performance score 140 for each skillset summary 136 in the skill summary bank 128. A "performance score," as used herein, is an evaluation of a user's skill. Performance score 140 may include a numerical or linguistic variable. A "linguistic variable," as used herein, is a variable with a value expressed by words or sentences. Performance score 140 may be based on one or more performance categories. A "performance category," as used herein, is a category of standards for evaluating a skillset summary 136. For example, performance score 140 may include a percentage or it may include linguistic variables such as "moderate," "extensive," "expert," "friendly," "fast," and the like. The performance category may include factors and variables to evaluate a user's skillset summary 136 against. Performance categories may include proficiency, experience, reception feedback, and the like. The performance categories may be derived from factors and variables identified in network data 120 and reception feedback 116 as described above. For example, the experience category may be commonly preferred level or years of experience a user is to have in a profession. In some embodiments computing device 104 may use a machine-learning model, such as a classifier to receive the network data 120 and reception feedback 116 as an input and output the performance categories, wherein the classifier is trained with data correlating elements of network data and reception feedback to performance categories. Generating the performance score 140 may include using a fuzzy set inference system as described further below. For example, each skillset summary 136 in skill summary bank 128 may be put into a fuzzy set, wherein each fuzzy set is compared and scored against one or more performance category fuzzy sets, wherein the output of the comparison is the performance score 140.

Still referring to FIG. 1, in an embodiment wherein a skillset summary 136 fuzzy set is compared to a plurality of performance categories fuzzy sets, computing device 104 may take each individual score generated, aggregate the values, and determine the average score to output as the overall performance score 140 for the skillset summary 136. In some embodiments, computing device 104 may derive once or more averaging values from network data 120 to compare skillset summary 136 to. An "averaging value," as used herein, is a value standard for determining a positive of negative impact on a performance score. A positive impact may refer to improving a performance score of a skillset summary. A negative impact may refer to lowering a performance score of a skillset summary. For example, computing device 104 may derive from network data 120 that, regarding an experience category, the average value is 5 years. If a user has 5 or more years of experience this may positively impact performance score 140 calculation. If a user has less than 5 years, below the averaging value, this may negatively impact performance score 140 calculation.

Still referring to FIG. 1, computing device 104 is configured to rank the plurality of skillsets based on the performance score 140. The plurality of skillets may be ranked in order of highest performance score 140 to lowest performance score 140 in the like. In some embodiments, rankings may be based on marketability. Marketability may refer to skillsets/skillset summaries 136 of a user that are more desirable in a profession or to customer/employers. Marketability may be determined using network data 120 and reception feedback 116 as described above. Determining marketability may use machine-learning process and fuzzy systems as described throughout this disclosure. Computing device 104 may train a web crawler to scrap and index data from job boards, professional newsletters, and the like to identify professions, skills, and the like that have the most demand in a market. For example, a user may have a plumber skillset, truck driver skillset, and electrician skillset. Computing device 104 may identify trends in network data 120 that there is a higher demand for electricians than plumbers and rank the skill sets accordingly.

Still referring to FIG. 1, computing device 104 is configured to generate a skill profile 144 based on the ranked plurality of skillsets. A "skill profile," as used herein, is an outline of information describing a user. Skill profile 144 may include the outline of skillset summaries 136, user identification, and rankings as described above. For example, skill profile 144 may include a user's photo, name, contact information, and the ranked plurality of skill sets. Skill profile 144 may be displayed through a graphical user interface or a plurality of third party devices communicatively connected to computing device 104. For example, a third party device may be a laptop operated by an employer seeking workers. Computing device 104 may retrieve a photo, contact information, and other elements of user data 112 using NPL models, OCR technology, web crawlers, and other methods as described above to populate skill profile 144 with. For example, an OCR reader may be configured to extract a phone number from user data 112. Computing device 104 may additionally populate skill profile 144 with the ranked plurality of skillset summaries 136 as described above. In some embodiments, computing device 104 may retrieve data stored in databases communicatively connected to computing device 104 to populate skill profile 144.

Figure 2:
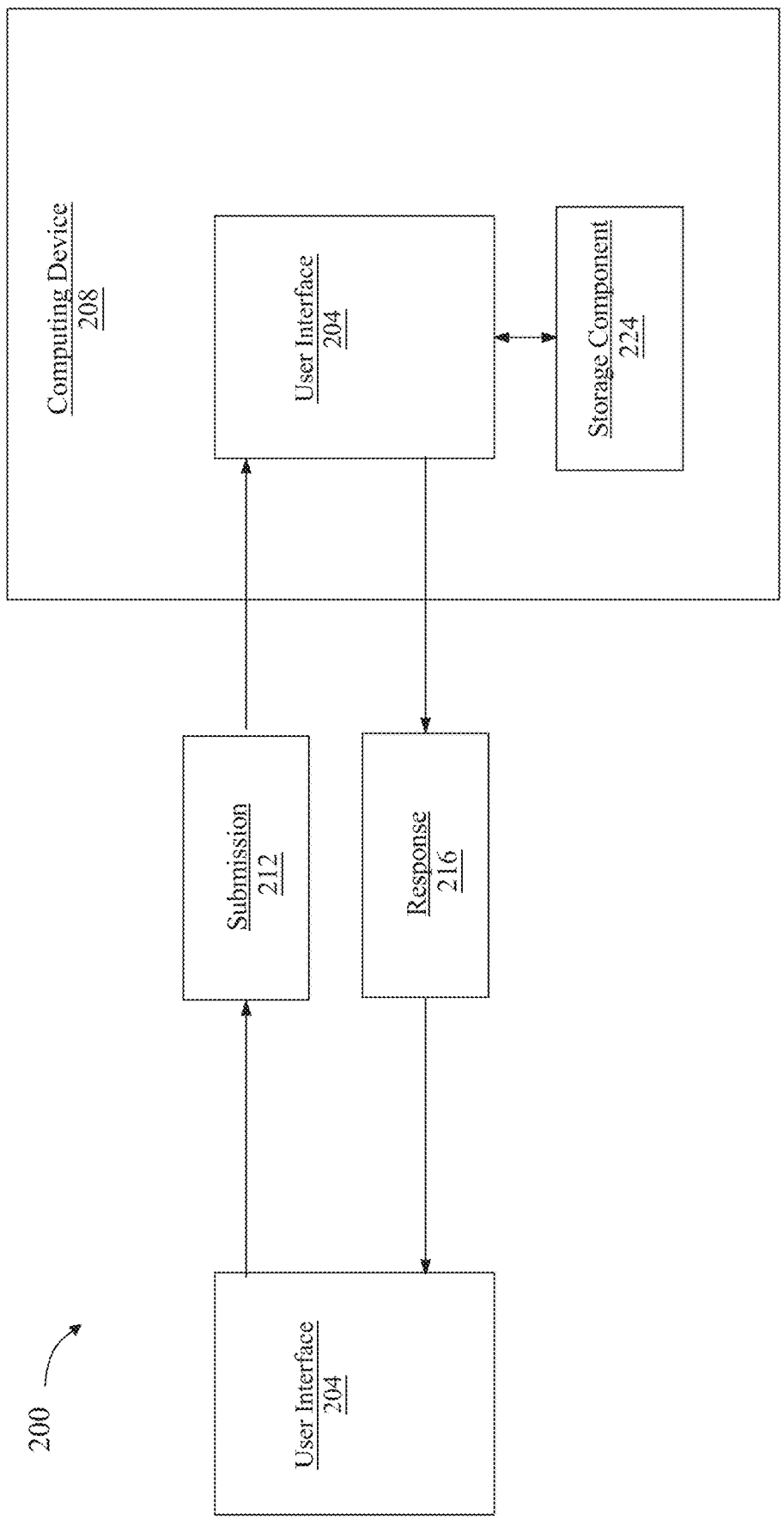
FIG. 2 is a block diagram illustrating a Chatbot.

Referring to FIG. 2, a chatbot system 200 is schematically illustrated. According to some embodiments, a user interface 204 may be communicative with a computing device 208 that is configured to operate a chatbot. In some cases, user interface 204 may be local to computing device 208. Alternatively or additionally, in some cases, user interface 204 may remote to computing device 208 and communicative with the computing device 208, by way of one or more networks, such as without limitation the internet. Alternatively or additionally, user interface 204 may communicate with user device 208 using telephonic devices and networks, such as without limitation fax machines, short message service (SMS), or multimedia message service (MMS). Commonly, user interface 204 communicates with computing device 208 using text-based communication, for example without limitation using a character encoding protocol, such as American Standard for Information Interchange (ASCII). Typically, a user interface 204 conversationally interfaces a chatbot, by way of at least a submission 212, from the user interface 208 to the chatbot, and a response 216, from the chatbot to the user interface 204. In many cases, one or both of submission 212 and response 216 are text-based communication. Alternatively or additionally, in some cases, one or both of submission 212 and response 216 are audio-based communication.

Continuing in reference to FIG. 2, a submission 212 once received by computing device 208 operating a chatbot, may be processed by a processor 220. In some embodiments, processor 220 processes a submission 212 using one or more of keyword recognition, pattern matching, and natural language processing. In some embodiments, processor employs real-time learning with evolutionary algorithms. In some cases, processor 220 may retrieve a pre-prepared response from at least a storage component 224, based upon submission 212. Alternatively or additionally, in some embodiments, processor 220 communicates a response 216 without first receiving a submission 212, thereby initiating conversation. In some cases, processor 220 communicates an inquiry to user interface 204; and the processor is configured to process an answer to the inquiry in a following submission 212 from the user interface 204. In some cases, an answer to an inquiry present within a submission 212 from a user device 204 may be used by computing device 108 as an input to another function, such as machine-learning models as described further below.

Figure 3:
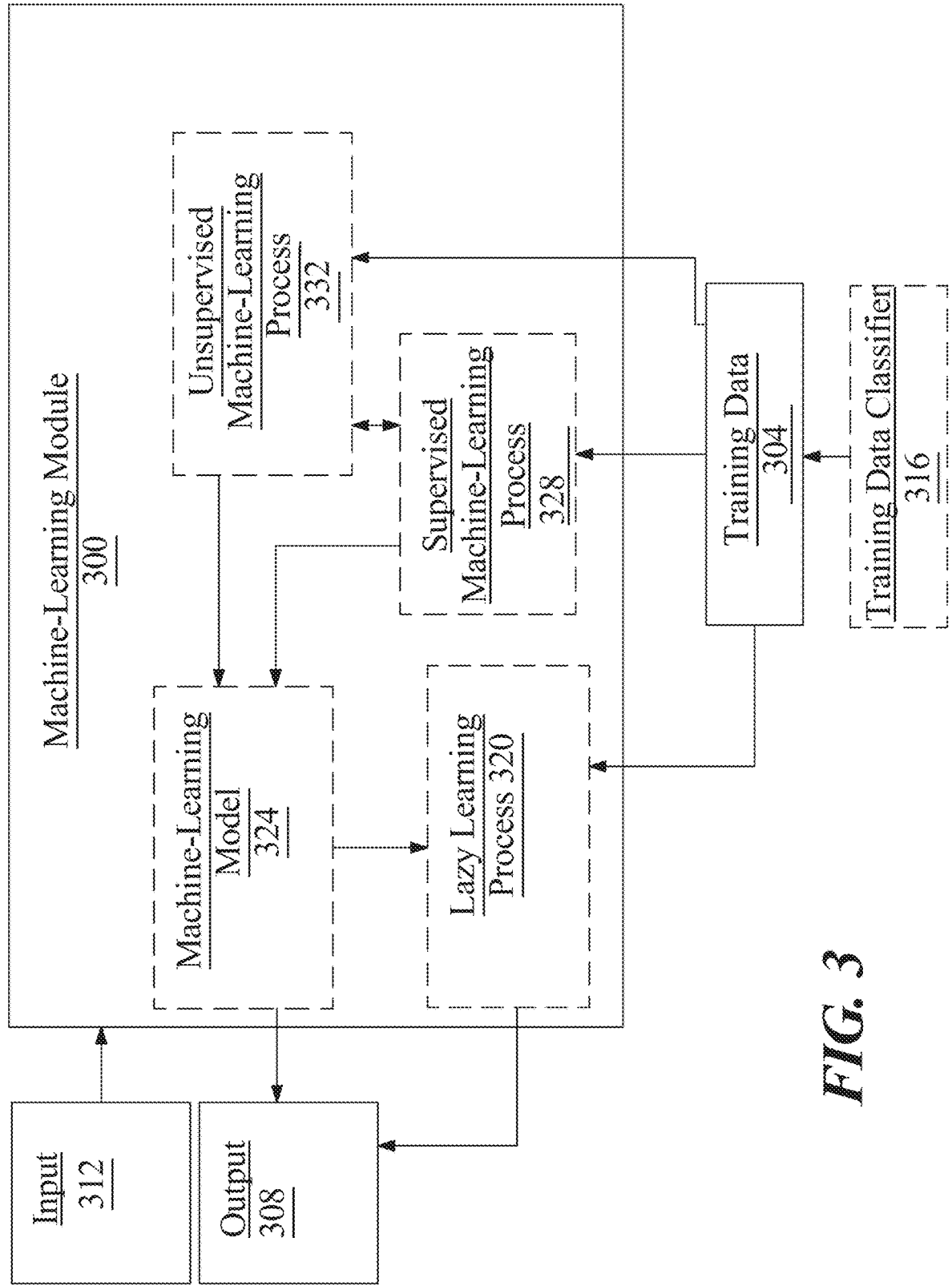
FIG. 3 is a block diagram of an exemplary machine-learning process.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm that will be performed by a computing device/module to produce outputs 308 given data provided as inputs 312; this is in contrast to a non-machine learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 300 may generate a classifier using a classification algorithm, defined as a processes whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine-learning processes as described in this disclosure may be used to generate machine-learning models 324. A "machine-learning model," as used in this disclosure, is a mathematical and/or algorithmic representation of a relationship between inputs and outputs, as generated using any machine-learning process including without limitation any process as described above and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network including an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include inputs and outputs described through this disclosure, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g., a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 4:
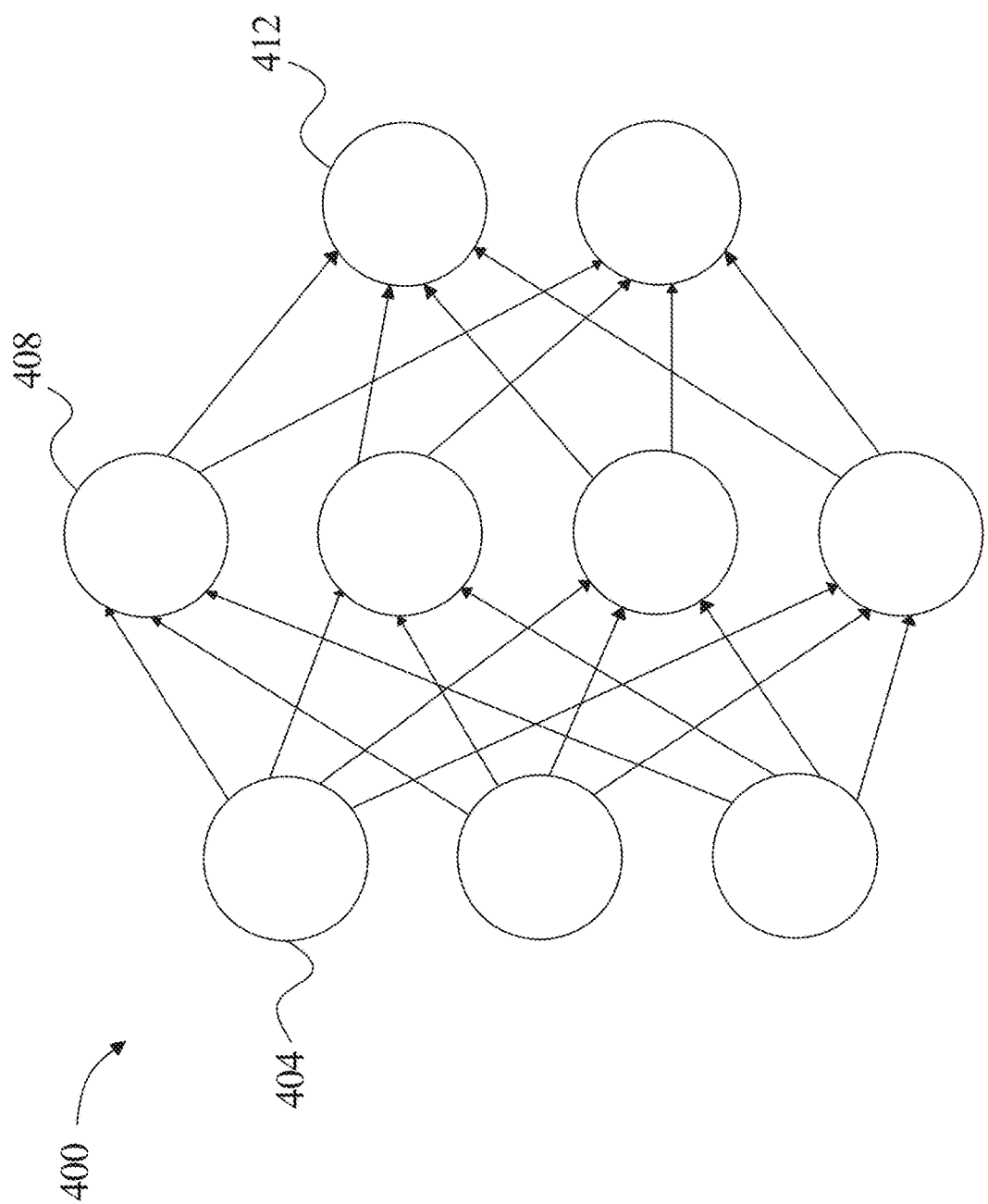
FIG. 4 is a diagram of an exemplary embodiment of neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network."

Figure 5:
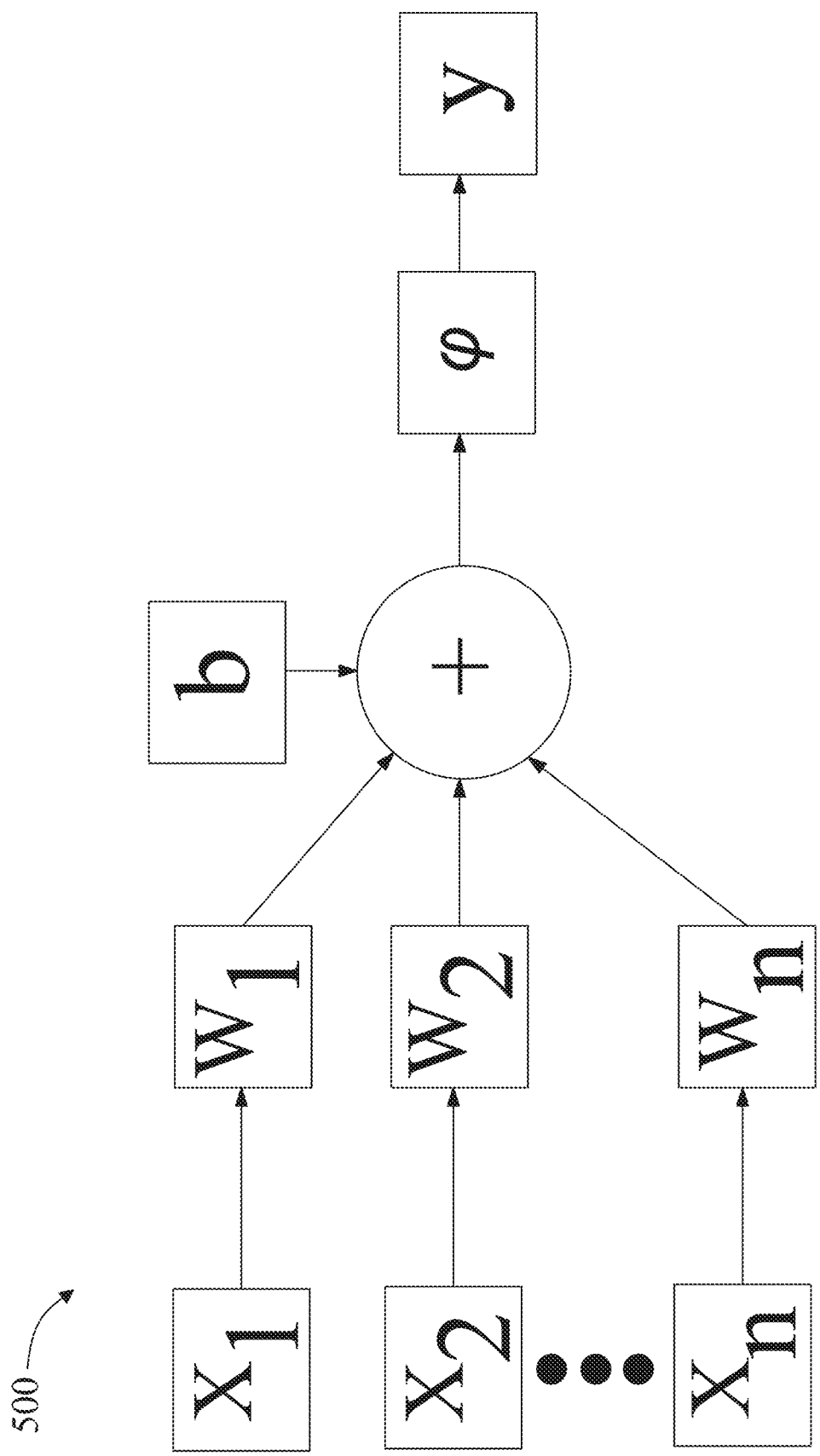
FIG. 5 is a diagram of an exemplary embodiment of a node of a neural network.

Referring now to FIG. 5, an exemplary embodiment of a node of a neural network is illustrated. A node may include, without limitation, a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 6:
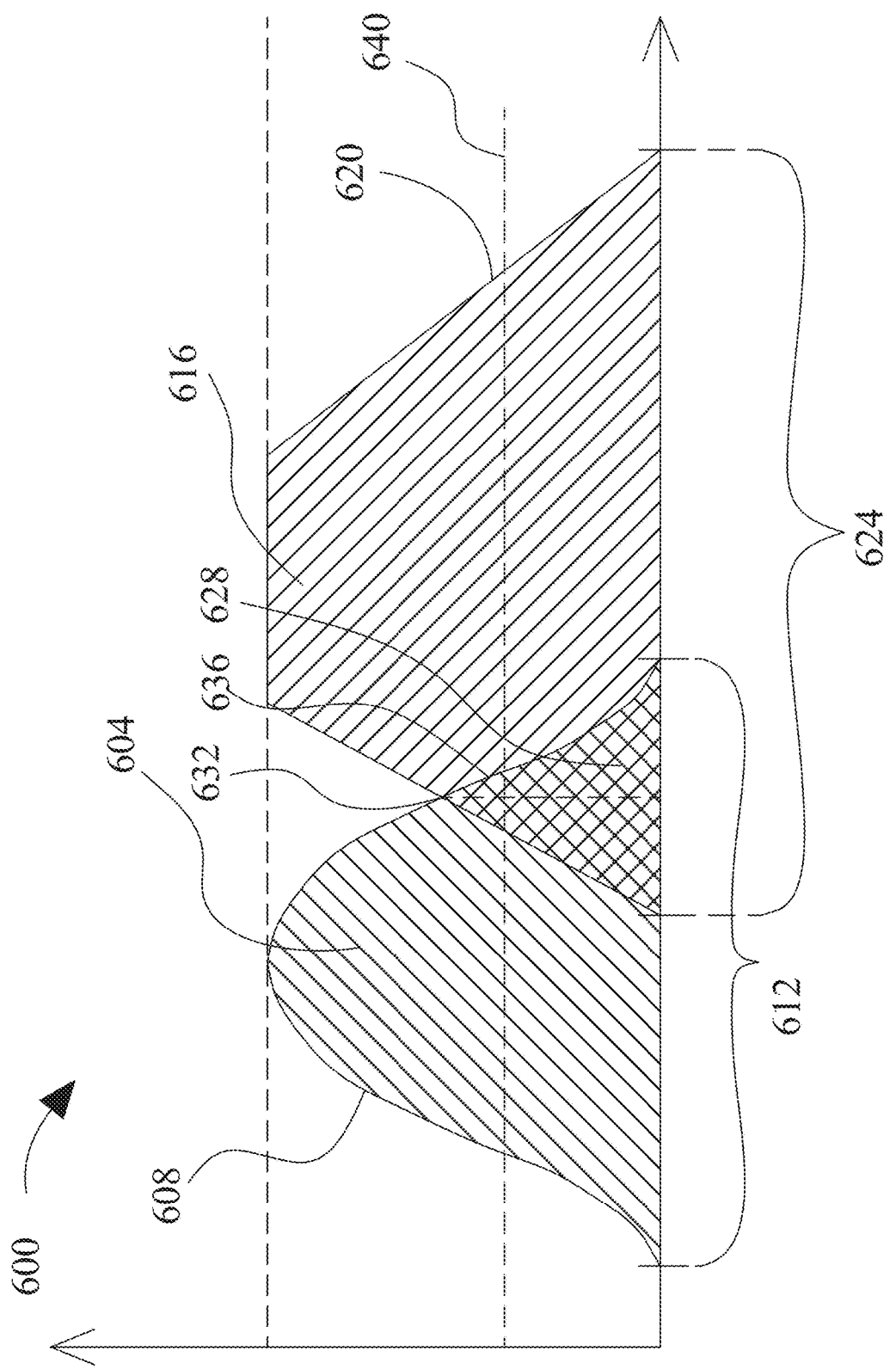
FIG. 6 is a diagram of fuzzy set comparison.

Referring to FIG. 6, an exemplary embodiment of fuzzy set comparison 600 is illustrated. A first fuzzy set 604 may be represented, without limitation, according to a first membership function 608 representing a probability that an input falling on a first range of values 612 is a member of the first fuzzy set 604, where the first membership function 608 has values on a range of probabilities such as without limitation the interval [0,1], and an area beneath the first membership function 608 may represent a set of values within first fuzzy set 604. Although first range of values 612 is illustrated for clarity in this exemplary depiction as a range on a single number line or axis, first range of values 612 may be defined on two or more dimensions, representing, for instance, a Cartesian product between a plurality of ranges, curves, axes, spaces, dimensions, or the like. First membership function 608 may include any suitable function mapping first range 612 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, \text{ for } x > c \text{ and } x < a \\ \frac{x-a}{b-a}, \text{ for } a \leq x < b \\ \frac{c-x}{c-b}, \text{ if } b < x \leq c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}\left(\frac{x-c}{\sigma}\right)^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

Still referring to FIG. 6, first fuzzy set 604 may represent any value or combination of values as described above, including output from one or more machine-learning models, skillset summary, and a predetermined class, such as without limitation of a performance category A second fuzzy set 616, which may represent any value which may be represented by first fuzzy set 604, may be defined by a second membership function 620 on a second range 624; second range 624 may be identical and/or overlap with first range 612 and/or may be combined with first range via Cartesian product or the like to generate a mapping permitting evaluation overlap of first fuzzy set 604 and second fuzzy set 616. Where first fuzzy set 604 and second fuzzy set 616 have a region 628 that overlaps, first membership function 608 and second membership function 620 may intersect at a point 632 representing a probability, as defined on probability interval, of a match between first fuzzy set 604 and second fuzzy set 616. Alternatively or additionally, a single value of first and/or second fuzzy set may be located at a locus 636 on first range 612 and/or second range 624, where a probability of membership may be taken by evaluation of first membership function 608 and/or second membership function 620 at that range point. A probability at 628 and/or 632 may be compared to a threshold 640 to determine whether a positive match is indicated. Threshold 640 may, in a non-limiting example, represent a degree of match between first fuzzy set 604 and second fuzzy set 616, and/or single values therein with each other or with either set, which is sufficient for purposes of the matching process; for instance, threshold may indicate a sufficient degree of overlap between an output from one or more machine-learning models and/or a skillset summary and a predetermined class, such as without limitation a performance category, for combination to occur as described above. Alternatively or additionally, each threshold may be tuned by a machine-learning and/or statistical process, for instance and without limitation as described in further detail below.

Further referring to FIG. 6, in an embodiment, a degree of match between fuzzy sets may be used to classify an skillset summary with performance category. For instance, if a performance category has a fuzzy set matching skillset summary fuzzy set by having a degree of overlap exceeding a threshold, computing device 104 may classify the skillset summary as belonging to the performance category categorization. Where multiple fuzzy matches are performed, degrees of match for each respective fuzzy set may be computed and aggregated through, for instance, addition, averaging, or the like, to determine an overall degree of match.

Still referring to FIG. 6, in an embodiment, a skillset summary may be compared to multiple performance category categorization fuzzy sets. For instance, skillset summary may be represented by a fuzzy set that is compared to each of the multiple performance category categorization fuzzy sets; and a degree of overlap exceeding a threshold between the skillset summary fuzzy set and any of the multiple performance category categorization fuzzy sets may cause Computing device 104 to classify the skillset summary as belonging to performance category categorization. For instance, in one embodiment there may be two performance category categorization fuzzy sets, representing respectively a proficiency performance category categorization and an experience performance category categorization. First performance category categorization may have a first fuzzy set; Second performance category categorization may have a second fuzzy set; and skillset summary may have an skillset summary fuzzy set. Computing device 104, for example, may compare an skillset summary fuzzy set with each of performance category categorization fuzzy set and in performance category categorization fuzzy set, as described above, and classify a skillset summary to either, both, or neither of performance category categorization or in performance category categorization. Machine-learning methods as described throughout may, in a non-limiting example, generate coefficients used in fuzzy set equations as described above, such as without limitation x, c, and σ of a Gaussian set as described above, as outputs of machine-learning methods. Likewise, skillset summary may be used indirectly to determine a fuzzy set, as skillset summary fuzzy set may be derived from outputs of one or more machine-learning models that take the skillset summary directly or indirectly as inputs.

Still referring to FIG. 6, a computing device may use a logic comparison program, such as, but not limited to, a fuzzy logic model to determine a performance category response, also referred a performance score. An performance category response may include, but is not limited to, moderate, average, knowledgeable, superior, and the like; each such performance category response may be represented as a value for a linguistic variable representing performance category response or in other words a fuzzy set as described above that corresponds to a degree of match as calculated using any statistical, machine-learning, or other method that may occur to a person skilled in the art upon reviewing the entirety of this disclosure. In other words, a given element of skillset summary may have a first non-zero value for membership in a first linguistic variable value such as "proficient" and a second non-zero value for membership in a second linguistic variable value such as "friendly" In some embodiments, determining a performance category categorization may include using a linear regression model. A linear regression model may include a machine learning model. A linear regression model may be configured to map data of skillset summary, such as degree of match to one or more performance category parameters. A linear regression model may be trained using a machine learning process. A linear regression model may map statistics such as, but not limited to, quality of skillset summary degree of match. In some embodiments, determining an performance category of skillset summary may include using a performance category classification model. An performance category classification model may be configured to input collected data and cluster data to a centroid based on, but not limited to, frequency of appearance, linguistic indicators of quality, and the like. Centroids may include scores assigned to them such that the quality of match of skillset summaries may each be assigned a score. In some embodiments performance category classification model may include a K-means clustering model. In some embodiments, performance category classification model may include a particle swarm optimization model. In some embodiments, determining the performance category of an skillset summary may include using a fuzzy inference engine. A fuzzy inference engine may be configured to map one or more skillset summary data elements using fuzzy logic. In some embodiments, skillset summary may be arranged by a logic comparison program into performance category arrangement. An "performance category arrangement" as used in this disclosure is any grouping of objects and/or data based on skill level and/or output score. This step may be implemented as described above in FIGS. 1-5. Membership function coefficients and/or constants as described above may be tuned according to classification and/or clustering algorithms. For instance, and without limitation, a clustering algorithm may determine a Gaussian or other distribution of questions about a centroid corresponding to a given performance score, and an iterative or other method may be used to find a membership function, for any membership function type as described above, that minimizes an average error from the statistically determined distribution, such that, for instance, a triangular or Gaussian membership function about a centroid representing a center of the distribution that most closely matches the distribution. Error functions to be minimized, and/or methods of minimization, may be performed without limitation according to any error function and/or error function minimization process and/or method as described in this disclosure.

Further referring to FIG. 6, an inference engine may be implemented according to input and/or output membership functions and/or linguistic variables. For instance, a first linguistic variable may represent a first measurable value pertaining to skillset summary, such as a degree of marketability of an element, while a second membership function may indicate a degree of match in performance category of a subject thereof, or another measurable value pertaining to skillset summary. Continuing the example, an output linguistic variable may represent, without limitation, a score value, such as performance score or an overall performance score. An inference engine may combine rules, such as: "if the experience level is 'average' and the popularity level is 'high', the overall performance score is 'high'"—the degree to which a given input function membership matches a given rule may be determined by a triangular norm or "T-norm" of the rule or output membership function with the input membership function, such as min (a, b), product of a and b, drastic product of a and b, Hamacher product of a and b, or the like, satisfying the rules of commutativity (T(a, b)=T(b, a)), monotonicity: (T(a, b)≤T(c, d) if a≤c and b≤d), (associativity: T(a, T(b, c))=T (T(a, b), c)), and the requirement that the number 1 acts as an identity element. Combinations of rules ("and" or "or" combination of rule membership determinations) may be performed using any T-conorm, as represented by an inverted T symbol or "⊥," such as max (a, b), probabilistic sum of a and b (a+b−a*b), bounded sum, and/or drastic T-conorm; any T-conorm may be used that satisfies the properties of commutativity: ⊥(a, b)=⊥(b, a), monotonicity: ⊥(a, b)≤⊥(c, d) if a≤c and b≤d, associativity: ⊥(a, ⊥(b, c))=⊥(⊥(a, b), c), and identity element of 0. Alternatively or additionally T-conorm may be approximated by sum, as in a "product-sum" inference engine in which T-norm is product and T-conorm is sum. A final output score or other fuzzy inference output may be determined from an output membership function as described above using any suitable defuzzification process, including without limitation Mean of Max defuzzification, Centroid of Area/Center of Gravity defuzzification, Center Average defuzzification, Bisector of Area defuzzification, or the like. Alternatively or additionally, output rules may be replaced with functions according to the Takagi-Sugeno-King (TSK) fuzzy model.

Figure 7:
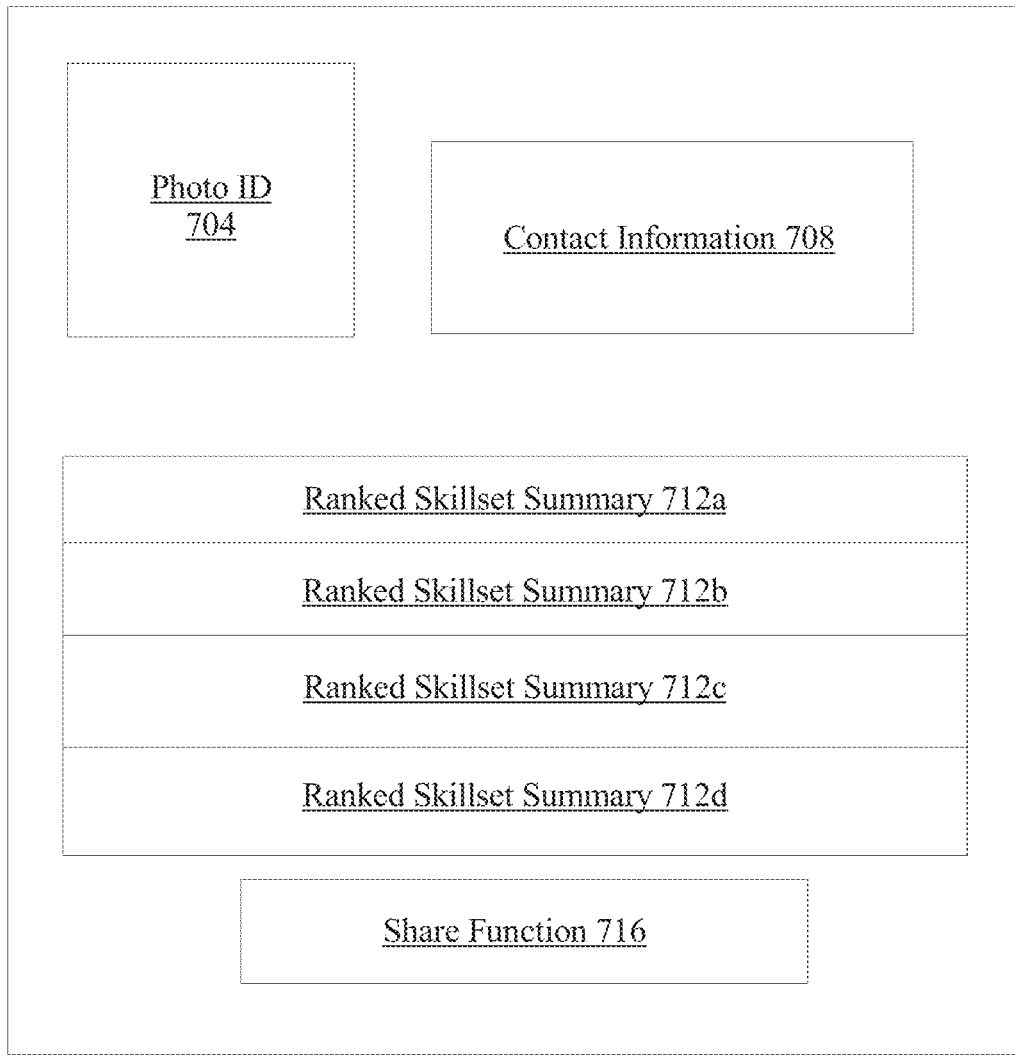
FIG. 7 is a diagram of a skill profile.

Referring now to FIG. 7, an exemplary diagram of skill profile 144 is illustrated. Skill profile 144 may include a photo identification (ID) 704 section including a photo of a user. Skill profile may include a contact information 708 section, wherein a user's contact information may be displayed. For example, contact information may include a phone number, physical address, email address, and the like. Skill profile 144 may include a plurality of ranked skillset summaries 712*a-d* section as described and with reference to FIG. 1. Additionally, skill profile 144 may include a share function 716 section. Share function 716 may allow for user or third party interaction through GUI to transmit, download, and copy skill profile over various platforms. For example, a user may be able to download skill profile 144 to a personal computing device, share skill profile 144 through a URL, and the like. Share function 716 may allow for the transmission or accessibility of skill profile 144 through an API query or API integration as described above. Share function 716 may allow for exporting of skill profile 144 in a text format, image format, excel format, csv file, and the like. Share function 716 may allow skill profile to printed out into a PDF or physical hard copy and the like. In some embodiments, skill profile 144 may include a feedback section, wherein through user and/or third party interaction through GUI, ratings, comments, and other forms of reception feedback may be submitted. For example, a third party may comment below a skillset summary leaving a review.

Figure 8:
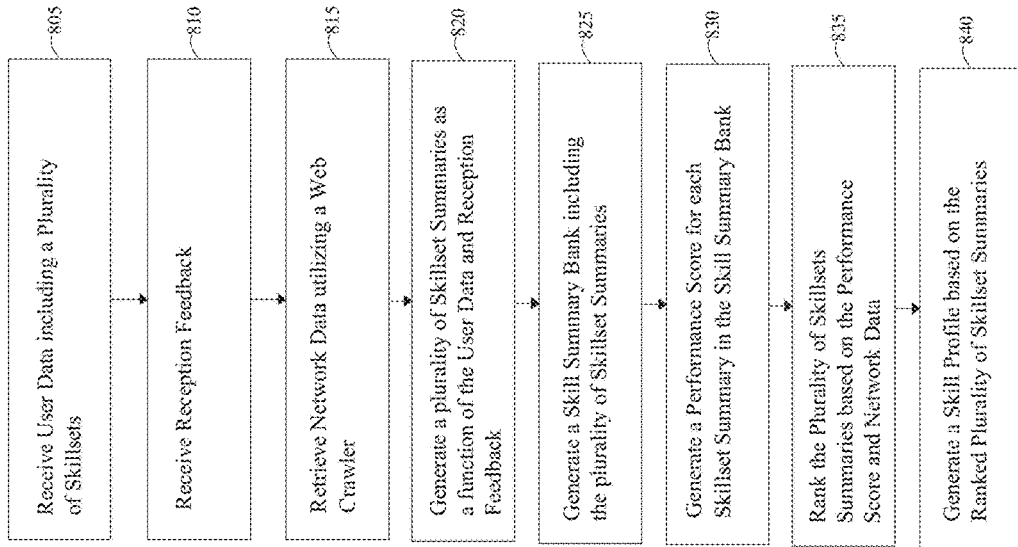
FIG. 8 is a flow diagram illustrating an exemplary method for generating a skill profile.

Referring now to FIG. 8, an exemplary flow chart of a method 800 for generating a skill profile is illustrated. At step 805, method 800 includes receiving, by a computing device, user data including a plurality of skillsets, for example, and as implemented in FIGS. 1-7. The user data may include a user identification. The user data may include an activity record related to a user. At step 810, method 800 includes receiving, by the at least computing device, reception feedback, for example, and as implemented in FIGS. 1-7. The reception feedback may include a description of user by a third reception. At step 815, method 800 includes retrieving, by the at least computing device, network data utilizing a web crawler, for example, and as implemented in FIGS. 1-7. The network data may include information regarding a practice area. At step 820, method 800 includes generating, by the at least computing device, a plurality of skillset summaries as a function of the user data and reception feedback, for example, and as implemented in FIGS. 1-7. Generating the plurality of skillset summaries may include receiving a summary training dataset including data correlating user data and reception feedback to a plurality of skillset summaries, training a summary classifier with the summary training data set, and outputting, using the summary classifier, the plurality of skillset summaries. At step 825, method 800 includes generating, by the at least computing device, a skill summary bank including the plurality of skillset summaries, for example, and as implemented in FIGS. 1-7. At step 830, method 800 includes generating, by the at least computing device, a performance score for each skillset summary in the skill summary bank, for example, and as implemented in FIGS. 1-7. The performance score may include a linguistic variable evaluating a skillset based on a performance category derived from the network data. Generating the performance score may include utilizing a fuzzy set inference system. Generating, by the at least computing device, a plurality of skillset summaries may include verifying the user data utilizing a codebot. Verifying the user data may further include receiving questionnaire classifier training data correlating elements of user data to elements of a skills test training a questionnaire classifier with the questionnaire classifier training data, and outputting, by the questionnaire classifier, the skills test. At step 835, method 800 includes ranking, by the at least computing device, the plurality of skillsets summaries based on the performance score and network data, for example, and as implemented in FIGS. 1-7. At step 840, method 800 includes generating, by the at least computing device, a skill profile based on the ranked plurality of skillset summaries, for example, and as implemented in FIGS. 1-7.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 9:
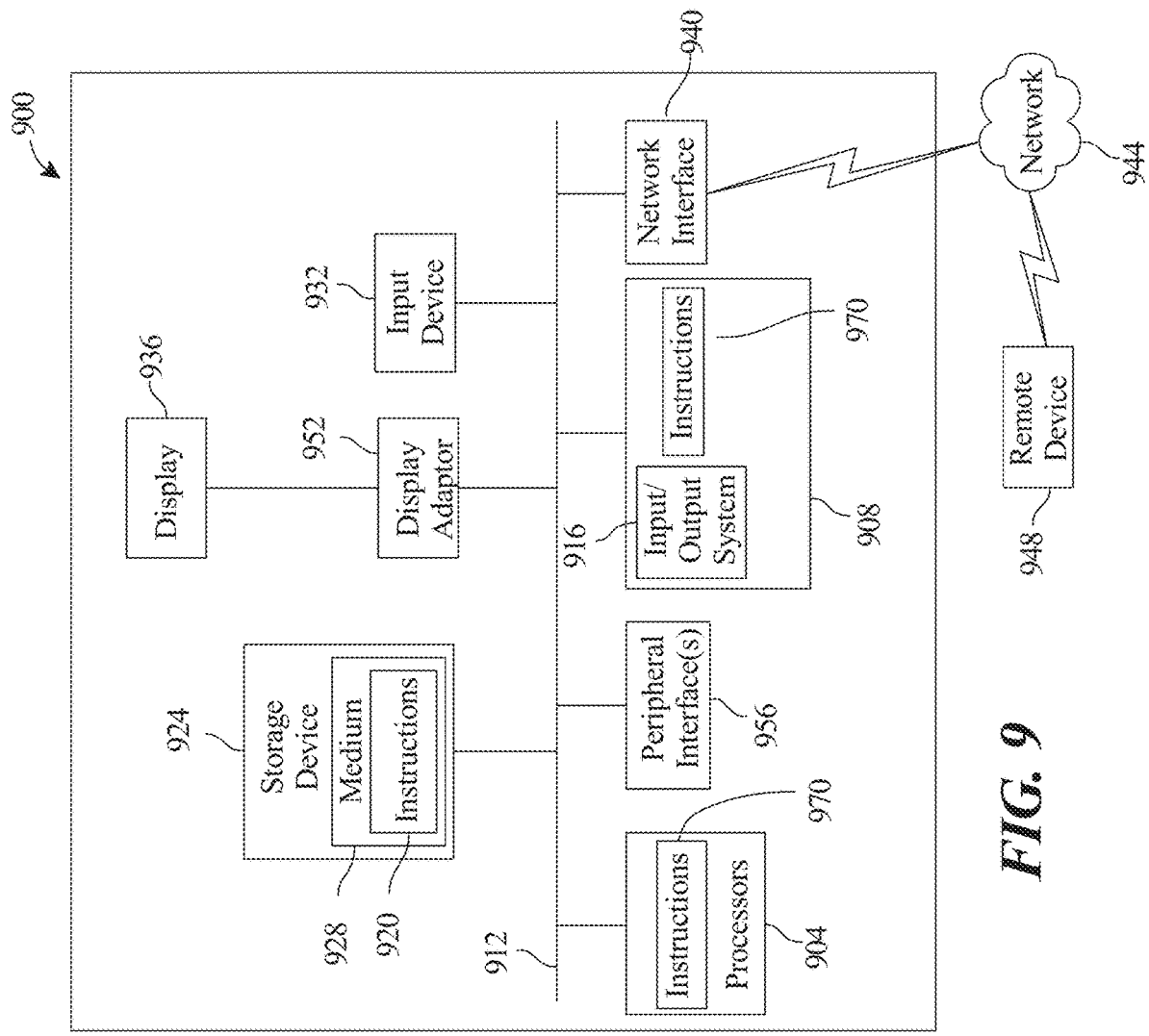
FIG. 9 is a block diagram of a computing system that can be used to implement any one or more of the methodologies disclosed herein and any one or more portions thereof.

FIG. 9 shows a diagrammatic representation of one embodiment of a computing device in the exemplary form of a computer system 900 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 900 includes a processor 904 and a memory 908 that communicate with each other, and with other components, via a bus 912. Bus 912 may include any of several types of bus structures including, but not limited to, a memory bus, a memory controller, a peripheral bus, a local bus, and any combinations thereof, using any of a variety of bus architectures.

Processor 904 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 904 may be organized according to Von Neumann and/or Harvard architecture as a non-limiting example. Processor 904 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 908 may include various components (e.g., machine-readable media) including, but not limited to, a random-access memory component, a read only component, and any combinations thereof. In one example, a basic input/output system 916 (BIOS), including basic routines that help to transfer information between elements within computer system 900, such as during start-up, may be stored in memory 908. Memory 908 may also include (e.g., stored on one or more machine-readable media) instructions (e.g., software) 920 embodying any one or more of the aspects and/or methodologies of the present disclosure. In another example, memory 908 may further include any number of program modules including, but not limited to, an operating system, one or more application programs, other program modules, program data, and any combinations thereof.

Computer system 900 may also include a storage device 924. Examples of a storage device (e.g., storage device 924) include, but are not limited to, a hard disk drive, a magnetic disk drive, an optical disc drive in combination with an optical medium, a solid-state memory device, and any combinations thereof. Storage device 924 may be connected to bus 912 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 924 (or one or more components thereof) may be removably interfaced with computer system 900 (e.g., via an external port connector (not shown)). Particularly, storage device 924 and an associated machine-readable medium 928 may provide nonvolatile and/or volatile storage of machine-readable instructions, data structures, program modules, and/or other data for computer system 900. In one example, software 920 may reside, completely or partially, within machine-readable medium 928. In another example, software 920 may reside, completely or partially, within processor 904.

Computer system 900 may also include an input device 932. In one example, a user of computer system 900 may enter commands and/or other information into computer system 900 via input device 932. Examples of an input device 932 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 932 may be interfaced to bus 912 via any of a variety of interfaces (not shown) including, but not limited to, a serial interface, a parallel interface, a game port, a USB interface, a FIRE-WIRE interface, a direct interface to bus 912, and any combinations thereof. Input device 932 may include a touch screen interface that may be a part of or separate from display 936, discussed further below. Input device 932 may be utilized as a user selection device for selecting one or more graphical representations in a graphical interface as described above.

A user may also input commands and/or other information to computer system 900 via storage device 924 (e.g., a removable disk drive, a flash drive, etc.) and/or network interface device 940. A network interface device, such as network interface device 940, may be utilized for connecting computer system 900 to one or more of a variety of networks, such as network 944, and one or more remote devices 948 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 944, may employ a wired and/or a wireless mode of communication. In general, any network topology may be used. Information (e.g., data, software 920, etc.) may be communicated to and/or from computer system 900 via network interface device 940.

Computer system 900 may further include a video display adapter 952 for communicating a displayable image to a display device, such as display device 936. Examples of a display device include, but are not limited to, a liquid crystal display (LCD), a cathode ray tube (CRT), a plasma display, a light emitting diode (LED) display, and any combinations thereof. Display adapter 952 and display device 936 may be utilized in combination with processor 904 to provide graphical representations of aspects of the present disclosure. In addition to a display device, computer system 900 may include one or more other peripheral output devices including, but not limited to, an audio speaker, a printer, and any combinations thereof. Such peripheral output devices may be connected to bus 912 via a peripheral interface 956. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, apparatuses, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for generating a skill profile, the apparatus comprising:
at least a processor; and
a memory communicatively connected to the at least a processor, the memory containing instructions configuring the at least a processor to:
receive user data comprising a plurality of skillsets from a user through a graphical user interface;
receive reception feedback associated with the user data using a web crawler, wherein the web crawler is configured to generate a web query and search through a plurality of websites in order to locate information correlated to the user data, and wherein receiving the reception feedback further comprises:
generating a language processing module using a stochastic gradient descent algorithm in order to iteratively optimize an objective function representing a statistical estimation of relationships between input terms and output terms; and
generating a reception feedback output using the language processing module, the language processing module configured to receive the information from the web crawler and determine associations between language elements within the information in order to extract data associated with at least one skillset of the plurality of skillsets;
retrieve network data utilizing the web crawler;
generate a plurality of skillset summaries as a function of the user data and the reception feedback, wherein generating the plurality of skillset summaries further comprises:
iteratively training a summary classifier using a summary training data set, wherein the summary classifier is a neural network, wherein the neural network includes an input layer of nodes, at least an intermediate layer, and an output layer of nodes, wherein weights between nodes in adjacent layers are adjusted to produce desired values at the output layer of nodes, wherein the summary training data set comprises a plurality of correlations between at least a reception feedback output and at least a user data input, and wherein iteratively training the summary classifier comprises:
detecting at least an additional correlation between the at least a reception feedback output and the at least a user data input; and
optimizing the summary classifier as a function of the at least an additional correlation, wherein optimizing the summary classifier further comprises using at least one reception feedback output as an input within the summary training data set;
generate a skill summary bank comprising the plurality of skillset summaries;
generate a performance score for each skillset summary in the skill summary bank;
rank the plurality of skillset summaries based on the performance score and the network data;
generate a skill profile based on the ranked plurality of skillset summaries;
select, via the user, a graphical user interface control element to initiate a share function to share the generated skill profile; and
download, via a third-party user, a CSV file containing the generated skill profile in response to the share function.

2. The apparatus of claim 1, wherein the user data comprises a user identification.

3. The apparatus of claim 1, wherein the user data comprises an activity record related to the user.

4. The apparatus of claim 1, wherein the reception feedback comprises a description of the user.

5. The apparatus of claim 1, wherein the network data comprises information regarding a practice area.

6. The apparatus of claim 1, wherein generating the plurality of skillset summaries comprises:
receiving the summary training dataset comprising data correlating the user data input and the reception feedback output to a plurality of skillset summaries;
training the summary classifier with the summary training data set; and
outputting, using the summary classifier, the plurality of skillset summaries.

7. The apparatus of claim 1, wherein the performance score comprises a linguistic variable evaluating a skillset based on a performance category derived from the network data.

8. The apparatus of claim 7, wherein generating the performance score comprises utilizing a fuzzy set inference system.

9. The apparatus of claim 1, wherein the at least processor is further configured to verify the user data utilizing a codebot.

10. The apparatus of claim 9, wherein verifying the user data further comprises:
   receiving questionnaire classifier training data correlating elements of user data to elements of a skills test;
   training a questionnaire classifier with the questionnaire classifier training data; and
   outputting, by the questionnaire classifier, the skills test.

11. A method for generating a skill profile, the method comprising:
   receiving, by at least a computing device, user data comprising a plurality of skillsets from a user through a graphical user interface;
   receiving, by the at least computing device, reception feedback associated with the user data using a web crawler, wherein the web crawler is configured to generate a web query and search through a plurality of websites in order to locate information correlated to the user data, and wherein receiving the reception feedback further comprises:
      generating a language processing module using a stochastic gradient descent algorithm in order to iteratively optimize an objective function representing a statistical estimation of relationships between input terms and output terms; and
      generating a reception feedback output using the language processing module, the language processing module configured to receive the information from the web crawler and determine associations between language elements within the information in order to extract data associated with at least one skillset of the plurality of skillsets;
   retrieving, by the at least computing device, network data utilizing the web crawler;
   generating, by the at least computing device, a plurality of skillset summaries as a function of the user data and the reception feedback, wherein generating the plurality of skillset summaries further comprises:
      iteratively training a summary classifier using a summary training data set, wherein the summary classifier is a neural network,
      wherein the neural network includes an input layer of nodes, at least an intermediate layer, and an output layer of nodes, wherein weights between nodes in adjacent layers are adjusted to produce desired values at the output layer of nodes, wherein the summary training data set comprises a plurality of correlations between at least a reception feedback output and at least a user data input, and wherein iteratively training the summary classifier comprises:
         detecting additional correlations between the at least a reception feedback output and the at least a user data input; and
         optimizing the summary classifier as a function of the at least an additional correlation, wherein optimizing the summary classifier further comprises using at least one reception feedback output as an input within the summary training data set;
   generating, by the at least computing device, a skill summary bank comprising the plurality of skillset summaries;
   generating, by the at least computing device, a performance score for each skillset summary in the skill summary bank;
   ranking, by the at least computing device, the plurality of skillset summaries based on the performance score and network data;
   generating, by the at least computing device, a skill profile based on the ranked plurality of skillset summaries;
   selecting, via a user, a graphical user interface control element to initiate a share function to share the generated skill profile; and
   downloading, via a third-party user, a CSV file containing the generated skill profile in response to the share function.

12. The method of claim 11, wherein the user data comprises a user identification.

13. The method of claim 11, wherein the user data comprises an activity record related to the user.

14. The method of claim 11, wherein the reception feedback comprises a description of the user.

15. The method of claim 11, wherein the network data comprises information regarding a practice area.

16. The method of claim 11, wherein generating the plurality of skillset summaries comprises:
   receiving the summary training dataset comprising data correlating the user data input and the reception feedback output to a plurality of skillset summaries;
   training the summary classifier with the summary training data set; and
   outputting, using the summary classifier, the plurality of skillset summaries.

17. The method of claim 11, wherein the performance score comprises a linguistic variable evaluating a skillset based on a performance category derived from the network data.

18. The method of claim 17, wherein generating the performance score comprises utilizing a fuzzy set inference system.

19. The method of claim 11, wherein generating, by the at least computing device, a plurality of skillset summaries comprises verifying the user data utilizing a codebot.

20. The method of claim 19, wherein verifying the user data further comprises:
   receiving questionnaire classifier training data correlating elements of user data to elements of a skills test;
   training a questionnaire classifier with the questionnaire classifier training data; and
   outputting, by the questionnaire classifier, the skills test.

* * * * *